United States Patent
Del Sarto et al.

(10) Patent No.: US 12,204,092 B2
(45) Date of Patent: Jan. 21, 2025

(54) INTEGRATED ELECTRONIC MODULE INCLUDING TWO MICROMIRRORS, AND SYSTEM INCLUDING THE ELECTRONIC MODULE

(71) Applicant: STMicroelectronics S.r.l., Agrate Brianza (IT)

(72) Inventors: Marco Del Sarto, Monza (IT); Alex Gritti, Vimercate (IT); Amedeo Maierna, Albuzzano (IT); Luca Maggi, Garlate (IT)

(73) Assignee: STMicroelectronics S.r.l.

( * ) Notice: Subject to any disclaimer, the term of this patent is extended or adjusted under 35 U.S.C. 154(b) by 609 days.

(21) Appl. No.: 17/480,634

(22) Filed: Sep. 21, 2021

(65) Prior Publication Data

US 2022/0099957 A1    Mar. 31, 2022

(30) Foreign Application Priority Data

Sep. 25, 2020    (IT) .................. 102020000022715

(51) Int. Cl.
    *G02B 26/08*    (2006.01)
    *G02B 26/10*    (2006.01)

(52) U.S. Cl.
    CPC ....... *G02B 26/0833* (2013.01); *G02B 26/101* (2013.01)

(58) Field of Classification Search
    CPC .................. G02B 26/0833; G02B 26/101
    USPC ................................................. 359/291
    See application file for complete search history.

(56) References Cited

U.S. PATENT DOCUMENTS

2017/0052364 A1    2/2017  Schatz et al.
2020/0382761 A1*  12/2020  Huang ............... G02B 27/0933

FOREIGN PATENT DOCUMENTS

| CN | 106660781 A | 5/2017 |
|---|---|---|
| CN | 107082406 A | 8/2017 |
| CN | 216310417 U | 4/2022 |
| DE | 102014207899 A1 | 10/2015 |
| EP | 3206071 A1 | 8/2017 |
| EP | 3712660 A1 | 9/2020 |
| KR | 20150042958 A | 4/2015 |

OTHER PUBLICATIONS

EPO Search Report and Written Opinion for family-related co-pending EP Appl. No. 21198930.6 dated Feb. 14, 2022, 9 pages.
IT Search Report and Written Opinion for IT Appl. No. 102020000022715 dated Jun. 14, 2021 (8 pages).
First Office Action and Search Report for counterpart CN Appl. No. 202111114931.0, report dated Sep. 13, 2024, 12 pgs.

* cited by examiner

*Primary Examiner* — William Choi
(74) *Attorney, Agent, or Firm* — Crowe & Dunlevy LLC (57) ABSTRACT

An electronic module includes a first die of semiconductor material including a first reflector, a second die of semiconductor material including a second reflector, and a frame including a first supporting portion and a second supporting portion parallel to one another. The first and second dies are carried, respectively, by the first and second supporting portions and are respectively arranged so that the first reflector faces the second supporting portion and the second reflector faces the first supporting portion. An incoming light beam impinges upon the first reflector and is reflected on the second reflector so as to be supplied at output from the electronic module.

43 Claims, 4 Drawing Sheets

INTEGRATED ELECTRONIC MODULE INCLUDING TWO MICROMIRRORS, AND SYSTEM INCLUDING THE ELECTRONIC MODULE

PRIORITY CLAIM

This application claims the priority benefit of Italian Application for Patent No. 102020000022715, filed Sep. 25, 2020, the disclosure of which is incorporated by reference in its entirety.

TECHNICAL FIELD

This disclosure relates to an electronic module including reflectors, in particular MEMS micromirrors, and a system including, or integrating, the electronic module.

BACKGROUND

Micromechanical mirror structures are known to be made, at least in part, of semiconductor materials and are obtained using MEMS (MicroElectroMechanical Systems) technology. Such micromechanical structures are typically integrated in portable apparatuses, such as, for example, portable computers, laptops, notebooks (including ultra-thin notebooks), PDAs, tablets, and smartphones. This integration into portable apparatuses is for optical applications, in particular for directing with desired modalities, beams of light radiation generated by a light source.

Thanks to the small dimensions of such structures, such structures make it possible to meet stringent requisites regarding the occupation of space, in terms of area and thickness.

For instance, micromechanical mirror structures (or micromirrors, typically obtained with MEMS technology) are used in miniaturized projector modules (so-called picoprojectors), which are able to project images at a distance or generate desired patterns of light.

In combination with an image-capturing module, a projector module of this kind makes it possible, for example, to obtain a three-dimensional (3D) photographic or video camera for the formation of three-dimensional images.

The aforesaid micromechanical mirror structures generally include a mirror element, obtained starting from a body of semiconductor material so as to be mobile, for example, with movement of tilting or rotation, to direct the incident light beam in a desired manner; and a supporting element, which is also obtained starting from a body of semiconductor material, coupled to the mirror element having supporting and handling functions. A cavity is made in the supporting element, set underneath and in a position corresponding to the mirror element, so as to enable freedom of movement thereof for inclination or rotation thereof.

Picoprojectors of a known type use micromirrors capable of rotating about two axes in order to carry out movements for scanning a two-dimensional area. In particular, in some solutions, micromirror systems comprise a pair of micromirrors governed so as to rotate about two mutually perpendicular rotation axes.

Moreover, with the introduction of the technology of in-depth detection, 3D detection is now widely used on smartphones and portable devices in general. In particular, this technology is expected to innovate safety methods through facial recognition.

One of the known methods for implementing 3D detection is based on a time-of-flight (ToF) approach. A typical ToF architecture includes an infrared (IR) source configured to generate and direct an IR pulse (an emitted beam) towards an object. In some applications, a beam reflected by the object is received by micromirrors which direct the reflected beam towards a detector. In other applications, the micromirrors are arranged at the level of the transmitter so as to generate an array of dots that strikes the target, and the receiver receives the pulses reflected from the target in response. The depth is calculated by measuring the time (direct ToF) or the phase offset (indirect ToF) between the emitted pulse or beam and the reflected pulse or beam. Another known method for implementing 3D detection is based on structured light. In this case, a known pattern is projected onto an object; the pattern thus projected is distorted by the object and an analysis of the distortion of the pattern of light can be used for calculating a value of depth and achieving a geometrical reconstruction of the shape of the object.

Figure 1:
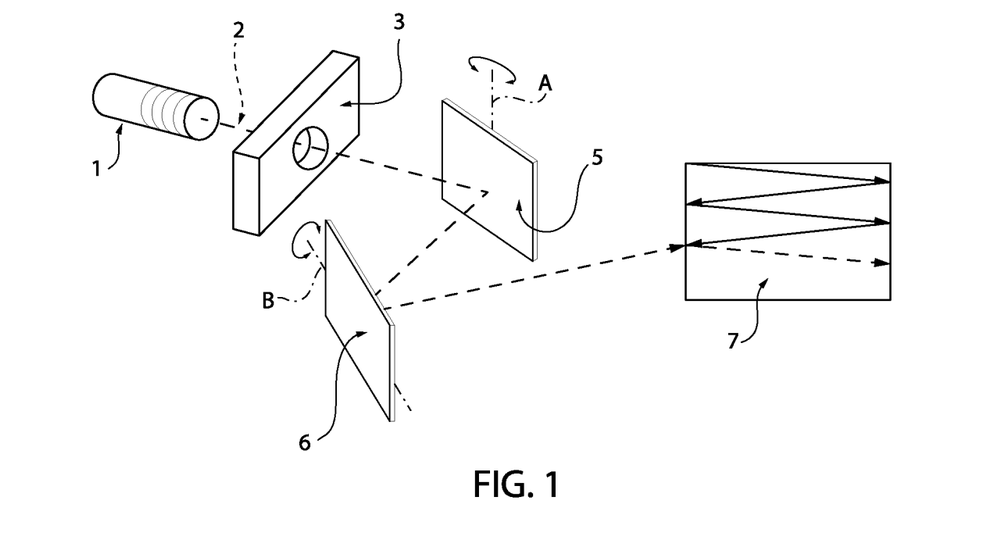
FIG. 1 is a schematic perspective view of an electronic system that can be used as picoprojector or for 3D-sensing applications, according to an embodiment of a known type.

For instance, FIG. 1 is a schematic illustration of a system (which can be applied generically to a projector or to a 3D-detection system) in which a light source 1, typically a LASER source, generates a light beam 2 which, through optics 3, is deflected by a pair of micromirrors 5, 6. The first micromirror 5 may, for example, be a horizontal micromirror, which rotates about a first axis A and generates a horizontal scan, and the second micromirror 6 may, for example, be a vertical micromirror, which rotates about a second transverse axis B, in particular perpendicular to the first axis A, and generates a vertical scan. The combination of the movements of the two micromirrors 5, 6 causes the light beam 2 to perform a movement of complete two-dimensional scanning movement and, once projected onto a projection screen 7, to generate a two-dimensional image thereon. Such a system is described, for example, in United States Patent Application Publication No. 20110234898 (International Patent Publication WO 2010/067354), incorporated by reference.

Embodiments of a known type envisage that the micromirrors 5, 6 are mounted manually in an electronic apparatus for which they are designed, each being already fixed to a respective support, to form two respective mirror assemblies.

During mounting, an operator picks up two mirror assemblies, one for a horizontal micromirror and the other for a vertical micromirror, and positions the two assemblies into the desired condition of alignment (for example, a collimated light beam can be used to obtain the desired alignment). Next, the operator applies a glue that can be polymerized via ultraviolet light, and the two mirror assemblies are fixed in the operating position.

The above type of assembly is slow, difficult, and considerably subject to errors. It follows that, with this method, the productivity and yield in terms of a pieces properly mounted is not optimal.

Other embodiments, for example, the one described in U.S. Pat. No. 10,338,378 (European Patent Number EP3206071), incorporated by reference, envisage that the two micromirrors, horizontal and vertical, are assembled on a same metal frame and are electrically wire-bonded to a respective electrical-connection element (flexible printed circuit) already fixed to the frame. Then the frame is bent so as to arrange the two micromirrors in the desired mutual angular arrangement. The bending step can be carried out automatically, without human intervention, using a forming press similar to the ones used in the semiconductor industry for shaping connection conductors in the packages of standard integrated circuits. The frame can be carried by a conveyor belt, together with a plurality of similar frames, and the individual frames can be separated after a single bending step.

The need is consequently felt in the art for a technical approach that will overcome the problems referred to above without having an impact on performance.

SUMMARY

Embodiments herein relate to an electronic module including two reflectors, in particular MEMS micromirrors, and a system including the electronic module, that will overcome the drawbacks of the prior art described above.

For example, disclosed herein is an electronic module including: a first die of semiconductor material including a first reflector; a second die of semiconductor material including a second reflector; and a frame including a first supporting portion and a second supporting portion, the first and second supporting portions extending parallel to one another; wherein the first and second dies are carried, respectively, by the first and second supporting portions and are respectively arranged so that the first reflector faces the second supporting portion and the second reflector faces the first supporting portion.

The first and second reflectors may be staggered with respect to one another.

The first and second supporting portions may be arranged at a mutual distance apart from one another so as to define a gap inside the frame.

The first supporting portion may have a defined therein a first cavity that is configured to house at least in part the first die so that the first reflector faces the gap, and a first through opening passing through the first supporting portion laterally to the first cavity. The second supporting portion may have defined therein a second cavity that is configured to house at least in part the second die so that the second reflector faces the gap, and a second through opening passing through the second supporting portion laterally to the second cavity.

The first supporting portion may also have defined therein a first through opening arranged laterally to the first cavity. The second supporting portion may also have defined therein a second through opening arranged laterally to the second cavity.

The first reflector, the second reflector, the first opening, and the second opening may be mutually arranged so that a beam enters the gap through one of the first and second openings, strikes the first reflector or the second reflector, is deflected towards the other one of the first reflector and the second reflector, and exits the gap through the other one of the first opening and the second opening.

At least one of the first and second openings may have inner walls coated with anti-reflective material shaped so as to limit multiple reflections within it.

At least one of the first and second openings may have inner walls shaped so as to limit multiple reflections within it.

The frame may be monolithic.

The first and second supporting portions may be joined together by a first connection portion having a bending area that joins the first and second supporting portions at a common connection portion.

The first and second supporting portions may also be joined together by a second connection portion having a respective bending area that joins the first and second supporting portions together.

The first and second supporting portions may have a rectangular shape and the first and second connection portions extend at opposite sides of the first and second supporting portions.

The first and second connection portions in some instances may not be coplanar with the first and second supporting portions.

The first and second supporting portions may each carry a first electrical-connection element and a second electrical-connection element, respectively, the first die being coupled to the first electrical-connection element and the second die being coupled to the second electrical-connection element.

The first electrical-connection element may be a board of a rigid-flexible type, the first die being coupled to a rigid portion of the first electrical-connection element. The second electrical-connection element may be a board of a rigid-flexible type, the second die being coupled to a rigid portion of the second electrical-connection element.

The first electrical-connection element may also carry a first electrical connector on a flexible portion of the first electrical-connection element. The second electrical-connection element may also carry a second electrical connector on a flexible portion of the second electrical-connection element.

The first and second supporting portions may also joined together by a first connection portion having a bending area that joins the first and second supporting portions at a common connection portion. The flexible portion that carries the first electrical connector may extend on a first side of the common connection portion, and the flexible portion that carries the second electrical connector may extend on a second side, opposite to the first side, of the common connection portion.

The first electrical-connection element may include a conductive track printed on the first supporting portion. The second electrical-connection element may include a conductive track printed on the second supporting portion.

The first and second supporting portions may be joined together by a first connection portion having a bending area that joins the first and second supporting portions at a common connection portion.

The common connection portion may carry a first electrical connector and a second electrical connector, the conductive track on the first supporting portion being electrically connected to the first electrical connector and the conductive track on the second supporting portion being electrically connected to the second electrical connector.

The first and second reflectors may be micromirror reflectors. At least one of the first and second reflectors may be configured to oscillate about a resting position.

The first and second supporting portions may be hermetically coupled together so that the gap is fluidically isolated with respect to an environment external to the electronic module, and the gap may be filled by a liquid or gaseous fluid.

Also disclosed herein is a system including an electronic module. The electronic module may include: a first die of semiconductor material including a first reflector; a second die of semiconductor material including a second reflector; and a frame including a first supporting portion and a second supporting portion parallel to one another. The first and second dies are carried, respectively, by the first and second supporting portions and are respectively arranged so that the first reflector faces the second supporting portion and the second reflector faces the first supporting portion. A generator of a first light beam is arranged and configured to supply the first light beam towards the first reflector. A detector is configured to receive a second reflected beam from the second reflector and generate a transduced signal. A processing unit, operatively coupled to the detector, is configured to carry out processing of the transduced signal.

The system may be configured to define a picoprojector, a 3D-detection system, or a LIDAR system.

When the system is configured to define a 3D-detection system, the processing may include carrying out a 3D detection of an object or a subject through a structured-light approach and/or a time-of-flight approach.

BRIEF DESCRIPTION OF THE DRAWINGS

For a better understanding, preferred embodiments thereof are now described purely by way of non-limiting example and with reference to the attached drawings, wherein.

DETAILED DESCRIPTION

The following disclosure enables a person skilled in the art to make and use the subject matter disclosed herein. The general principles described herein may be applied to embodiments and applications other than those detailed above without departing from the spirit and scope of this disclosure. This disclosure is not intended to be limited to the embodiments shown, but is to be accorded the widest scope consistent with the principles and features disclosed or suggested herein.

Figure 2A:
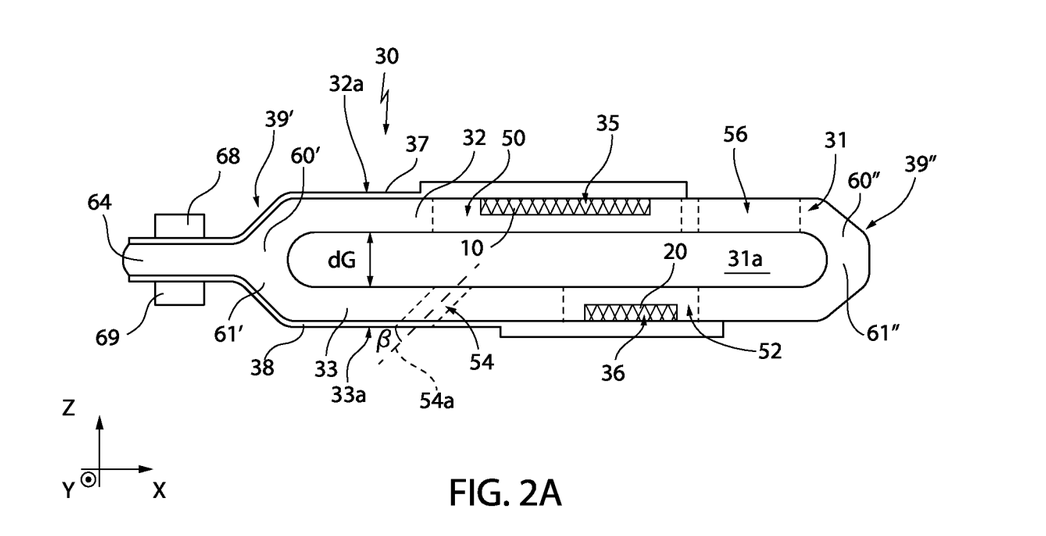
FIG. 2A illustrates, in cross-sectional view, a module including a supporting element that carries two electronic boards of a rigid-flexible type, mounted on which are respective reflectors, in particular micromirrors, and corresponding electrical connectors, according to an aspect of this disclosure.

FIG. 2A shows, in cross-sectional view in a triaxial reference system of mutual orthogonal axes X, Y, Z, a module 30 that is to be mounted in an electronic apparatus (not illustrated).

Figure 2B:
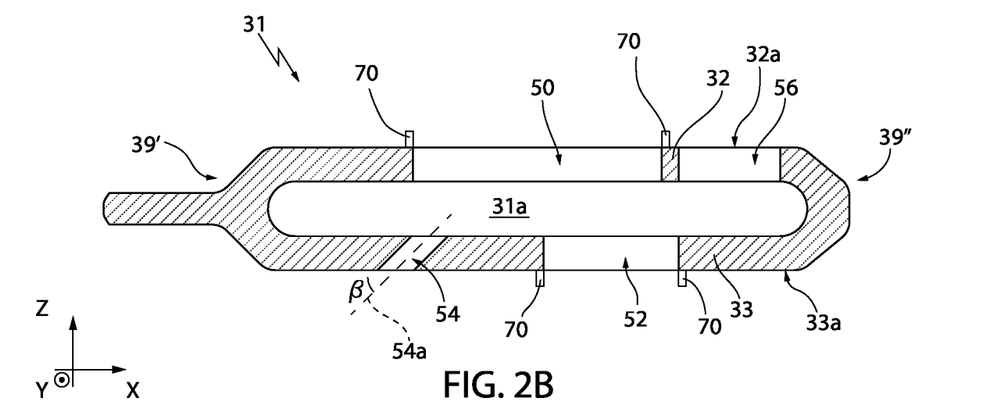
FIG. 2B illustrates, in cross-sectional view, the supporting element of FIG. 2A.

FIG. 2B shows, in the same cross-sectional view and the same reference system as those of FIG. 2A, a frame 31 of the module 30.

Figure 2C:
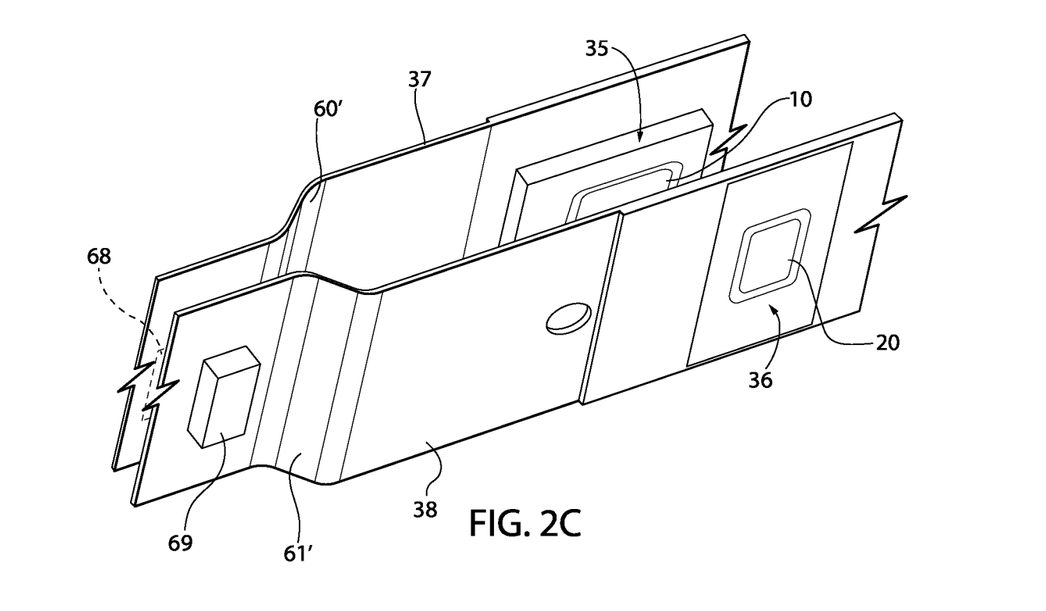
FIG. 2C illustrates, in perspective view, the two electronic boards, mounted on which are respective reflectors, of the module of FIG. 2A.

FIG. 2C is a perspective view, in the same reference system as that of FIGS. 2A and 2B, of rigid-flexible electronic boards (with ends "broken", for greater clarity of representation) adapted to be coupled to the frame 31 to produce the module 30.

With joint reference to FIGS. 2A-2C, the frame 31 is of a monolithic type and includes a first supporting portion 32 adapted to house a first die 35, and a second supporting portion 33 adapted to house a second die 36. The first supporting portion 32 is parallel to, and extends at a distance $d_G$ from, the second supporting portion 33.

It is evident that, in respective embodiments, the frame 31 may be a single piece or may be made up of different elements joined (for example, soldered) together.

The first supporting portion 32 is joined to the second supporting portion 33 at two connection regions 39', 39" provided with respective curved or bent portions, which join the first and second supporting portions 32, 33 together. In this manner, between the first and second supporting portions 32, 33 a gap 31a is present that may be empty (i.e., air or some other gas is present) or filled with appropriate material (such as a liquid, or a gel, or the like), according to the specific application for which the module 30 is designed.

In an embodiment, the support portions 32, 33 and the connecting regions 39', 39" form a fluid-tight structure, i.e., the space 31a internally defined by them is fluidically isolated from the external environment.

Figure 6:
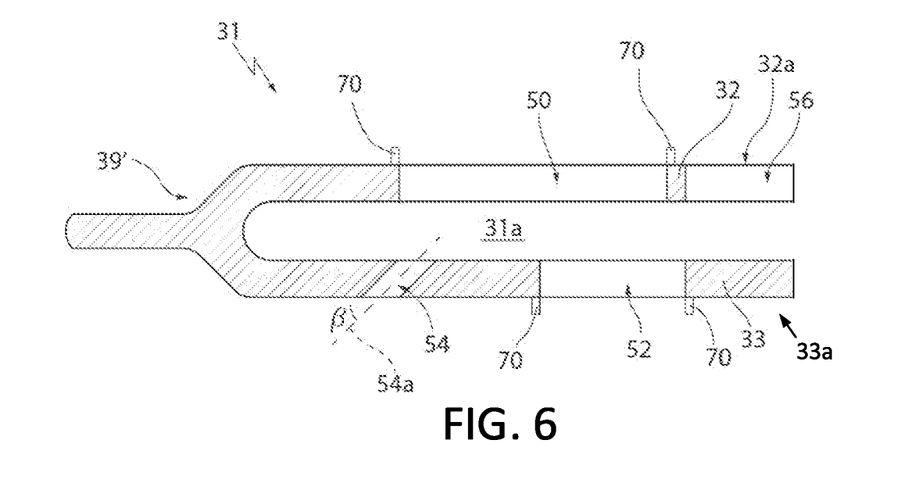
FIG. 6 illustrates, in cross-sectional view, a variation of the supporting element of FIG. 2B.

In one embodiment, the connection region 39" may likewise be omitted (i.e., it is not present), with the first and second support portions 32, 33 being connected to each other only at the connection region 39'. This embodiment may be seen in FIG. 6.

In a further embodiment, the connection region 39" is releasably coupled to the first and second support portions 32, 33, for example by means of a suitable coupling-uncoupling system (e.g. of a plug-and-socket type), so that the connection region 39" can be removed if desired and reinserted later.

In a further embodiment, the connection region 39" is a single piece with the first and second support portions 32, 33 (i.e., they form a monolithic block).

In a further embodiment, the connection region 39" is welded, or secured by glue or other adhesive, to the first and second support portions 32, 33, in a non-releasable manner.

The frame 31 may be of metal material, e.g., anodized aluminum, or plastic material or some other material still, such as ceramic material or glass, or yet other materials chosen according to the need.

The first die 35, manufactured, for example, using semiconductor micromachining techniques, integrates a first reflector 10, in particular a reflector (also known as a micromirror) produced using MEMS technology. The second die 36, in particular manufactured using semiconductor micromachining techniques, integrates a second reflector 20, in particular a reflector (micromirror) produced using MEMS technology. The first and second reflectors 10, 20 are configured to be coupled to an activation or control system (common to both reflectors or dedicated to each reflector), which, when operated, causes the respective MEMS reflector to oscillate about a resting position. Micromirrors of this type are, for example, described in the U.S. Pat. No. 9,843,779 and in United Stated Patent Application No. 2018/0180873, both of which are incorporated by reference.

It is in any case possible to use other types of reflectors or micromirrors, as will be evident to the person skilled in the art. In particular, this disclosure is not limited to a specific technology of actuation of the reflector (piezoelectric, electrostatic, etc.).

The first reflector 10 is configured to oscillate about a first oscillation axis, whereas the second reflector 20 is configured to oscillate about a respective second oscillation axis transverse (in particular, orthogonal) to the first oscillation axis.

Alternatively, in a further embodiment, one or both of the first and second reflectors 10, 20 may be designed and configured to oscillate along both of the oscillation axes.

Alternatively, in a further embodiment, one between the first and second reflectors 10, 20 may be of a fixed type (i.e., it does not oscillate).

The frame 31 carries two electrical-connection structures 37, 38, one for each die 35, 36, obtained, for example, as flexible printed circuits and, more in particular, as rigid-flexible printed circuits formed (in particular, embedded) in which are electrical-connection lines (not represented in detail). The electrical-connection structures 37, 38, and in particular the electrical-connection lines of each of them, are electrically connected to the dies 35, 36, e.g., via wire bonding. The electrical-connection structure 37 is coupled (e.g., glued) to a surface 32a of the first supporting portion 32; the electrical-connection structure 38 is coupled (e.g., glued) to a surface 33a of the second supporting portion 33.

It is evident that, if one between the first and second reflectors 10, 20 is of a fixed type, the electrical-connection lines of the respective electrical-connection structure 37 or 38 may be omitted or, if present, not used.

The first supporting portion 32 includes a housing 50, configured to house the first die 35, and the second supporting portion 33 includes a housing 52, configured to house the second die 36. The housing 50 and the housing 52 are through openings in the respective supporting portion 32, 33, and have a shape and dimensions such that the respective first and second dies 35, 36 insert into the respective housing 50, 51 in a stable manner, and the respective reflectors 10, 20 face the gap 31a and, consequently, the opposite supporting portion 32, 33. In other words, the first reflector 10, carried by the die 35 inserted in the housing 50 made in the first supporting portion 32, faces the second supporting portion 33. Likewise, the second reflector 20, carried by the die 36 inserted in the housing 51 made in the second supporting portion 33, faces the first supporting portion 32.

The second supporting portion 33 moreover has a through hole 54, configured to enable passage of an incoming light radiation, or beam, for example generated by a source of the type illustrated in FIG. 1 and designated by the reference number 1 (e.g., a laser source). The light source is adapted to generate a beam that is to be deflected, in use, by the reflectors 10, 20, to be emitted at output from the module 30. For this purpose, the first supporting portion 32 moreover has a through hole 56, configured to enable passage of an outgoing beam, i.e., the beam reflected by the second reflector 20. The through hole 56 may be replaced by a generic opening in a different portion of the module 30 (for example, by eliminating the connection region 39" and leaving the module 30 open at the region 39" represented in the figures).

The through hole 54 has, in this embodiment, a substantially cylindrical shape with an axis 54a that forms an angle β of approximately 45° with the plane defined by the second portion 33 (in particular with the surface 33a of the second portion 33). The value of the angle may in any case vary and be chosen in the range between 25° and 65° (where β=0° indicates that the axis 54a of the hole 54 is parallel to the surface 33a of the second supporting portion 33, and β=90° indicates that the axis 54a of the hole 54 is orthogonal to the surface 33a of the second supporting portion 33). However, it is possible to vary the angle β with respect to the values mentioned above, for example, reaching the value of 90°, provided that the incoming beam can hit the first reflector 10 without being deflected by, or without interfering significantly with, the inner walls of the hole 54.

The through hole 54 may have, as an alternative to the cylindrical shape, a conical shape or some other shape still chosen according to the need, in particular for limiting multiple reflections inside it.

The hole 54 and the hole 56 may be internally coated with a non-reflective material, of a suitable type (e.g., belonging to the category of ARCs—Anti-Reflective Coatings).

Figure 3:
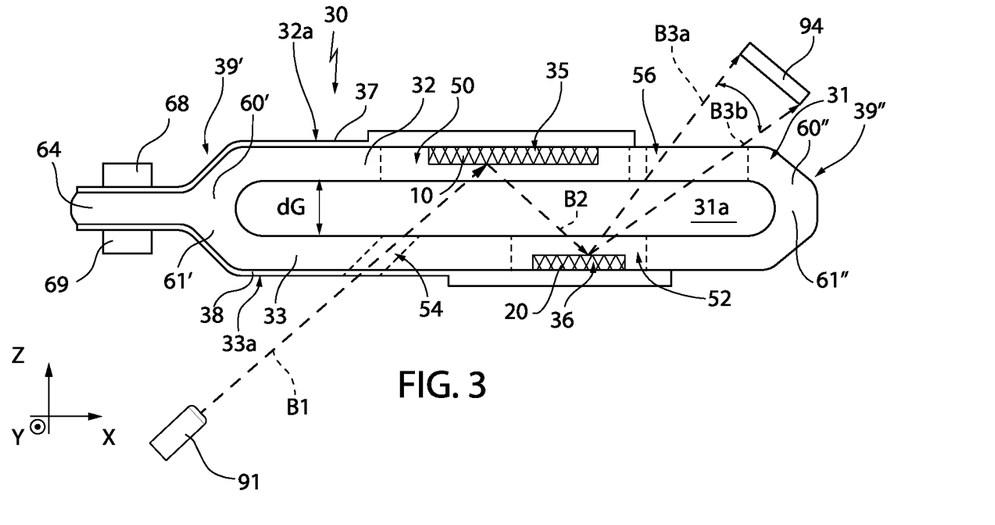
FIG. 3 illustrates, in schematic cross-sectional view, the module of FIG. 2A in a condition of use.

Furthermore, it may be noted that the housings 50, 51 and, consequently, the reflectors 10, 20, are vertically staggered with respect to one another, i.e., staggered with respect to the axis Z orthogonal to the surfaces 32a and 33a. In this manner, as shown schematically in FIG. 3, reflecting surfaces of the reflectors 10, 20 do not directly face one another (i.e., they are not aligned along a same axis parallel to the axis Z), but are arranged in a position such that the first reflector 10 can receive an incoming beam B1 through the hole 54 (with a certain angle of reception, for example, 45°) and can deflect the beam B1 towards the second reflector 20 (reflected beam B2); in turn, the second reflector 20 can deflect the beam B2 received towards the output hole 56 of the module 30, to generate the beam B3a or B3b. As illustrated in FIG. 3, the second reflector 20 is in this case of an oscillating type, and, by oscillating, can vary the angle at which the beam is directed towards the output hole 56, thus generating beams B3a, B3b having a desired angle or direction.

FIG. 3 moreover shows a generator 91 of the beam B1 (e.g., a laser or some other optical source of radiation or light beam), and a detector 94 of the emitted radiation or beam B3a-B3b. The type of the detector 94 varies according to the specific application and may not be present in the case of 3D detection of objects.

As has been anticipated, a gap 31a is present between the supporting portions 32, 33. The supporting portions 32, 33 can be coupled together so that the gap 31a will be closed with respect to the external environment (so that the gap 31a can be filled by a liquid or gaseous fluid or be set in vacuum conditions in order to improve the dynamic control of the two mirrors and increase the reliability of the system during its service life, thanks to elimination of the air in contact with the mirrors). Alternatively, the supporting portions 32, 33 can be coupled together so that the gap 31a will be in fluid communication with the outside so as to be able to receive a (liquid or gaseous) fluid present in the external environment, for example, for carrying out an analysis of said fluid by analyzing the interaction thereof with the beam reflected by the reflectors 10, 20.

Alternatively, the gap 31a can be filled with a solid material, transparent for the beam received at input to, and transmitted at output from, the module 30, such as plastic resins or gels.

The supporting portions 32, 33 of the frame 31 have a generically polygonal shape (in top view in the plane XY); in the examples illustrated in the figures, the supporting portions 32, 33 have a rectangular shape.

In the embodiment illustrated, the connection region 39' comprises two connection arms or elements 60', 61' having a respective first end connected, respectively, to the first and second supporting portions 32, 33, and respective second ends connected together and to a portion 64. In this manner, each connection arm 60', 61' forms a bending area that joins the first and second supporting portions 32, 33 to the portion 64.

In addition, also the connection region 39" comprises two connection arms or elements 60", 61" having a respective first end connected (in a releasable or not releasable way, as stated before) to the first supporting portion and to the second supporting portion 32, 33, respectively (on sides thereof opposite to the connection arms 60', 61'), and respective second ends connected together. In this manner, each connection arm 60", 61" forms a further bending area that joins together the first and second supporting portions 32, 33.

As may be noted from FIG. 2A, the electrical-connection structures 37, 38 extend, on opposite faces of the module 30, on the supporting portions 32, 33, along the connection arms 60', 61', and on the portion 64. In particular, the portion 64 is adapted to house connectors 68, 69, which are adapted to form an interface of connection between the module 30 and a system in which the module 30 is to be inserted or with which the module 30 is to be used. Each connector 68, 69 is electrically connected to the respective reflector 10, 20 by the respective electrical-connection lines integrated or present in the electrical-connection structures 37, 38, in particular for controlling the respective reflector 10, 20 in oscillation during use. The type, shape, and technical characteristics of these connectors 68, 69 do not form the subject of the present invention, and consequently are not described any further.

It may be noted that production of the frame 31, which includes the first and second supporting portions 32, 33, the connection arms 60, 61, and the portion 64, can be carried out according to any suitable technology.

For instance, the frame 31 can be obtained by soldering or gluing or fixing together in some other manner the first and second supporting portions 32, 33, the connection arms 60, 61, and the portion 64 (each of these elements being obtained according to any suitable technology, e.g., 3D printing, molding, die-casting, etc.).

Alternatively, the frame 31 may be obtained by making the first and second supporting portions 32, 33, the connection arms 60, 61, and the portion 64 of a single piece, for example, using processes of die-casting of metal material.

Alternatively, the frame 31 may be obtained via known machining processes, starting from a solid piece of material and appropriately modelling it by progressive removal of material, until the desired final shape is obtained.

Alternatively, the frame 31 may be obtained by making the first and second supporting portions 32, 33, the connection arms 60, 61, and the portion 64 in a single piece, for example, using processes of molding of plastic or polymeric material.

Alternatively, the frame 31 may be obtained by making the first and second supporting portions 32, 33, the connection arms 60, 61, and the portion 64, in a single piece using 3D printing. It may be noted that 3D-printing technologies currently available enable manufacturing of both the frame 31 and the electrical connections adapted to connect the reflectors 10, 20 to the connectors 68, 69, by printing respective materials. Consequently, in this case, it is not necessary to use a flexible or rigid-flexible printed circuit that presents electrical connections or wires adapted to connect the dies 35, 36 to the connectors 68, 69.

With reference to FIG. 2B, alignment elements 70 are optionally present, here illustrated in the form of small pillars or pins that protrude from the frame 31, along one or more of the first and second supporting portions 32, 33, the connection arms 60, 61, and the portion 64; each electrical-connection structure 37, 38 has alignment holes (not illustrated), configured to couple to respective alignment elements 70. This facilitates the steps of coupling between the electrical-connection structures 37, 38 and the frame 31, in particular alignment between the dies 35, 36 and the housings 50, 51.

Figure 4:
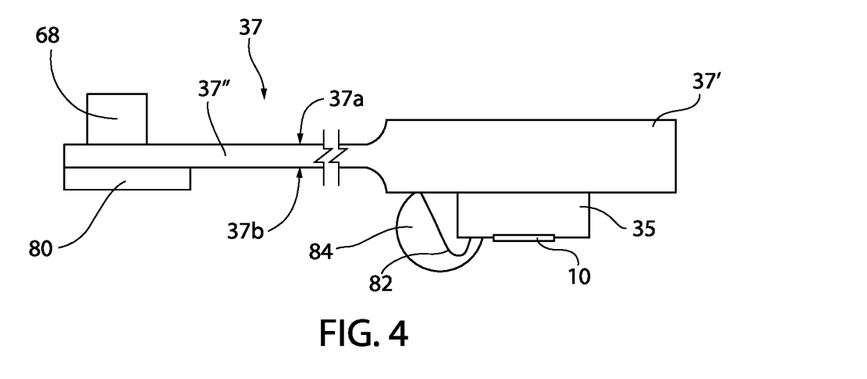
FIG. 4 illustrates, schematically and in cross-sectional view, a board of a rigid-flexible type adapted to be used for mounting a reflector, in particular a micromirror, and a corresponding connector, according to an aspect of this disclosure.

FIG. 4 is a schematic illustration of the electrical-connection structure 37, which carries the first die 35. The electrical-connection structure 37 has a first face 37a and a second face 37b opposite to one another. The electrical-connection structure 37 is, for example, a rigid-flexible board of an FCCL (Flex Copper Clad Laminate) type, with four layers (also known as 4L), i.e., having four metal layers that can be used for the electrical connections discussed previously. Alternatively, it is also possible to use a rigid-flexible board of an FCCL type with double metal layer (2L), according to the need. It is evident that these are just two possible non-limiting examples, and other types of flexible or rigid-flexible boards or substrates can be used.

With reference to FIG. 4, the electrical-connection structure 37 represented is of a rigid-flexible type; i.e., it comprises a rigid portion 37' having a stiffness greater than that of a flexible portion 37" that is contiguous to, and extends as a prolongation of, the rigid region 37'. After the electrical-connection structure 37 has been pre-arranged, the next step is formation (e.g., via gluing) of an element 80 at an end portion of the flexible portion 37", on the face 37b. The element 80 is, for example, made of metal, for instance, copper or aluminum, or other materials such as BT/FR4 or plastic materials, with a thickness of between 200 and 300 µm, and has the function of increasing locally the stiffness of the flexible portion 37" to favor handling thereof. This step can be omitted in the case where no difficulties of handling are encountered.

Then, the connector 68 is coupled (e.g., soldered, glued, or fixed in some other manner) to the face 37a of the electrical-connection structure 37, at the flexible portion 37" and in particular at the element 80 (as has been said, on the face 37a opposite to the face 37b that houses the element 80).

Then, the die 35 is coupled (e.g., glued or fixed in some other manner) to the rigid portion 37', on the face 37b. Electrical-connection wires 82 are formed for connecting pads for control of the die 35 to the electrical connections present on the electrical-connection structure 37 so as to provide the electrical connection for controlling the reflector 10. The electrical-connection wires 82 are coated with a protective material 84, for example, epoxy-based or silicone-based resins. The face 37b of the electrical-connection structure 37 is the one that is arranged directly facing the first supporting portion 32.

Similar operations, not described in detail in so far as they are in themselves evident, are carried out on the electrical-connection structure 38, for coupling the connector 69 and the die 36 of the electrical-connection structure 38.

According to one embodiment, the input hole 54 and/or the output hole 56 may optionally include a respective lens, through which the beam entering or leaving, respectively, the module 30 passes. This lens, for example, has the function of collimating the incoming beam in the case of the hole 54; and of correcting the divergence, either leading to collimation or increasing the divergence of the outgoing beam according to the different applications, in the case of the output hole 56.

The module 30 described according to the this disclosure can be used in a time-of-flight device/photographic camera for carrying out 3D detection, for example, for applications on smartphones, such as facial recognition. In this context, direct or sinusoidal short light flashes are generated by an emitter towards the input hole 54; the beam entering the module 30 is appropriately reflected by the reflectors 10, 20 and is emitted at output through the hole 56; said emitted beam strikes an object and is reflected back, once again entering the module 30 through the hole 56 and, following the reverse reflection path, is made to exit through the hole 54 (received beam). This example does not find application where the receiver is separate from the transmitter. The received beam is then captured by a detector to be analyzed. The travel time of the beam from the emitter to the object and back to the detector is calculated by processing hardware (for example, a processor, or a processing unit). The co-ordinates measured are then used for generating a 3D image of the object.

The module 30 can also be used in the context of structured-light applications for 3D detection. In this case, the detector is preferably a CMOS sensor formed by an array of pixels, adapted to detect an image from the incoming beam. Processing algorithms can be used for acquiring information from the image detected for carrying out 3D detection, such as facial recognition.

Other possible applications include the use of the module 30 in LIDAR systems or devices that can be used, for example, in applications for autonomous driving of vehicles.

Yet other applications include the use of the module 30 in systems or applications for the projection of images (e.g., picoprojectors).

Figure 5:
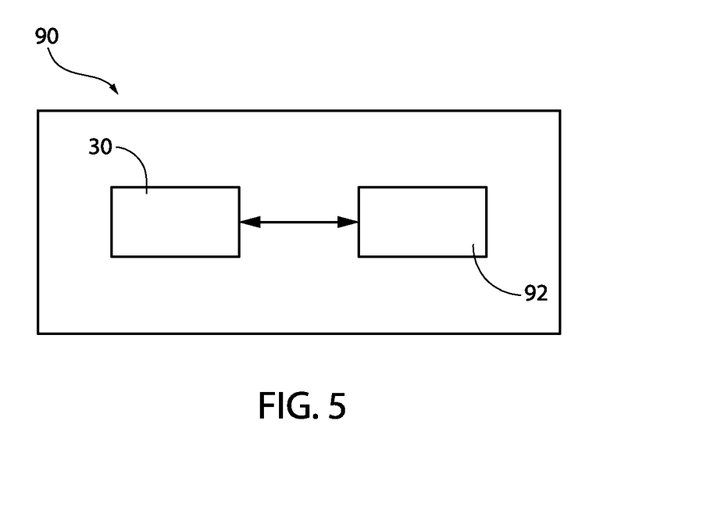
FIG. 5 is a schematic representation, by functional blocks, of a system that integrates or uses the module of FIG. 2A.

FIG. 5 is a schematic illustration of a system 90, in particular a 3D scanning device or 3D scanner, which includes at least one module 30, operatively coupled to a processing unit 92 that is configured for carrying out 3D detection based on a structured-light approach, a time-of-flight approach, or the like. For instance, in the case of the time-of-flight approach, the processing unit 92 is configured to calculate a travel time between a first instant, corresponding to generation of a first radiation by the emitter, and a second instant, corresponding to the detection of a second radiation received by the detector (i.e., the travel time of the beam from the emitter to the object and back to the detector). Regardless of the approach used, a 3D image of the object can be reconstructed by the processing unit 92.

From an examination of the characteristics of the present description, the advantages deriving therefrom are evident.

By integrating all the components in a module at the level of packaging structure, the volumes of the solution are reduced and optimized.

In addition, the module 30 can be provided, to be mounted in electronic apparatuses or systems, already complete with the two micromirrors arranged in the desired mutual angular and spatial position. In this manner, mounting can be carried out automatically by pick-and-place machines, so reducing the costs of assembly and the risks of erroneous positioning, and thus increasing yield.

Assembly of the mirror assemblies in electronic apparatuses using automatic machines, without human intervention, reduces costs and increases productivity.

Finally, it is clear that modifications and variations may be made to what has been described and illustrated herein, without thereby departing from the scope of this disclosure, as defined in the annexed claims.

While the disclosure has been described with respect to a limited number of embodiments, those skilled in the art, having benefit of this disclosure, will appreciate that other embodiments can be envisioned that do not depart from the scope of the disclosure as disclosed herein. Accordingly, the scope of the disclosure shall be limited only by the attached claims.

The invention claimed is:

1. An electronic module, comprising:
   a first die of semiconductor material including a first reflector;
   a second die of semiconductor material including a second reflector; and
   a frame including a first supporting portion and a second supporting portion, wherein the first and second supporting portions extend parallel to one another;
   wherein the first and second supporting portions are joined together by a first connection portion having a bending area that joins the first and second supporting portions at a common connection portion; and
   wherein the first and second dies are carried, respectively, by the first and second supporting portions and are respectively arranged so that the first reflector faces the second supporting portion and the second reflector faces the first supporting portion.

2. The electronic module according to claim 1, wherein the first and second reflectors are staggered with respect to one another.

3. The electronic module according to claim 1, wherein the first and second supporting portions are arranged at a mutual distance apart from one another so as to define a gap inside the frame.

4. The electronic module according to claim 3:
   wherein the first supporting portion has defined therein a first cavity that is configured to house at least in part the first die so that the first reflector faces the gap, and a first through opening passing through the first supporting portion laterally to the first cavity; and
   wherein the second supporting portion has defined therein a second cavity that is configured to house at least in part the second die so that the second reflector faces the gap, and a second through opening passing through the second supporting portion laterally to the second cavity.

5. The electronic module according to claim 4:
   wherein the first supporting portion also has defined therein a first through opening arranged laterally to the first cavity; and
   wherein the second supporting portion also has defined therein a second through opening arranged laterally to the second cavity.

6. The electronic module according to claim 5, wherein said first reflector, said second reflector, said first opening, and said second opening are mutually arranged so that a beam enters the gap through one of the first and second openings, strikes the first reflector or the second reflector, is deflected towards the other one of the first reflector and the second reflector, and exits the gap through the other one of the first opening and the second opening.

7. The electronic module according to claim 3:
   wherein the first and second supporting portions are hermetically coupled together so that said gap is fluidically isolated with respect to an environment external to the electronic module; and
   wherein the gap is filled by a liquid or gaseous fluid.

8. The electronic module according to claim 1:
   wherein the first and second supporting portions are also coupled to a second connection portion having a respective bending area that joins the first and second supporting portions together.

9. The electronic module according to claim 8, wherein said second connection portion is coupled to the first and second supporting portions in a releasable fashion.

10. The electronic module according to claim 8, wherein said second connection portion is coupled to the first and second supporting portions in a non-releasable fashion.

11. The electronic module according to claim 8,
wherein the first and second supporting portions have a rectangular shape and the first and second connection portions extend at opposite sides of the first and second supporting portions.

12. The electronic module according to claim 1, wherein the first and second connection portions are not coplanar with the first and second supporting portions.

13. The electronic module according to claim 1, wherein the first and second supporting portions each carry a first electrical-connection element and a second electrical-connection element, respectively, the first die being coupled to the first electrical-connection element and the second die being coupled to the second electrical-connection element.

14. The electronic module according to claim 13:
wherein the first electrical-connection element is a board of a rigid-flexible type, the first die being coupled to a rigid portion of the first electrical-connection element; and
wherein the second electrical-connection element is a board of a rigid-flexible type, the second die being coupled to a rigid portion of the second electrical-connection element.

15. The electronic module according to claim 14:
wherein the first electrical-connection element also carries a first electrical connector on a flexible portion of the first electrical-connection element; and
wherein the second electrical-connection element also carries a second electrical connector on a flexible portion of the second electrical-connection element.

16. The electronic module according to claim 15:
wherein the first and second supporting portions are joined together by a first connection portion having a bending area that joins the first and second supporting portions at a common connection portion; and
wherein the flexible portion that carries the first electrical connector extends on a first side of the common connection portion, and the flexible portion that carries the second electrical connector extends on a second side, opposite to the first side, of the common connection portion.

17. The electronic module according to claim 13:
wherein the first electrical-connection element includes a conductive track printed on the first supporting portion; and
wherein the second electrical-connection element includes a conductive track printed on the second supporting portion.

18. The electronic module according to claim 17:
wherein the first and second supporting portions are joined together by a first connection portion having a bending area that joins the first and second supporting portions at a common connection portion; and
wherein the common connection portion carries a first electrical connector and a second electrical connector, said conductive track on the first supporting portion being electrically connected to the first electrical connector and said conductive track on the second supporting portion being electrically connected to the second electrical connector.

19. The electronic module according to claim 1:
wherein the first and second reflectors are micromirror reflectors; and
wherein at least one of the first and second reflectors is configured to oscillate about a resting position.

20. An electronic module comprising:
a first die of semiconductor material including a first reflector;
a second die of semiconductor material including a second reflector; and
a frame including a first supporting portion and a second supporting portion, wherein the first and second supporting portions extend parallel to one another;
wherein the first and second dies are carried, respectively, by the first and second supporting portions and are respectively arranged so that the first reflector faces the second supporting portion and the second reflector faces the first supporting portion;
wherein the first and second supporting portions are arranged at a mutual distance apart from one another so as to define a gap inside the frame;
wherein the first supporting portion has defined therein a first cavity that is configured to house at least in part the first die so that the first reflector faces the gap, and a first through opening passing through the first supporting portion laterally to the first cavity;
wherein the second supporting portion has defined therein a second cavity that is configured to house at least in part the second die so that the second reflector faces the gap, and a second through opening passing through the second supporting portion laterally to the second cavity;
wherein the first supporting portion also has defined therein a first through opening arranged laterally to the first cavity;
wherein the second supporting portion also has defined therein a second through opening arranged laterally to the second cavity; and
wherein at least one of the first and second openings has inner walls coated with anti-reflective material shaped so as to limit multiple reflections within it.

21. The electronic module according to claim 20, wherein said first reflector, said second reflector, said first opening, and said second opening are mutually arranged so that a beam enters the gap through one of the first and second openings, strikes the first reflector or the second reflector, is deflected towards the other one of the first reflector and the second reflector, and exits the gap through the other one of the first opening and the second opening.

22. The electronic module according to claim 20, wherein the first and second supporting portions each carry a first electrical-connection element and a second electrical-connection element, respectively, the first die being coupled to the first electrical-connection element and the second die being coupled to the second electrical-connection element.

23. The electronic module according to claim 20:
wherein the first and second reflectors are micromirror reflectors; and
wherein at least one of the first and second reflectors is configured to oscillate about a resting position.

24. The electronic module according to claim 20:
wherein the first and second supporting portions are hermetically coupled together so that said gap is fluidically isolated with respect to an environment external to the electronic module; and
wherein the gap is filled by a liquid or gaseous fluid.

25. An electronic module comprising:
a first die of semiconductor material including a first reflector;

a second die of semiconductor material including a second reflector; and a frame including a first supporting portion and a second supporting portion, wherein the first and second supporting portions extend parallel to one another;

wherein the first and second dies are carried, respectively, by the first and second supporting portions and are respectively arranged so that the first reflector faces the second supporting portion and the second reflector faces the first supporting portion;

wherein the first and second supporting portions are arranged at a mutual distance apart from one another so as to define a gap inside the frame;

wherein the first supporting portion has defined therein a first cavity that is configured to house at least in part the first die so that the first reflector faces the gap, and a first through opening passing through the first supporting portion laterally to the first cavity;

wherein the second supporting portion has defined therein a second cavity that is configured to house at least in part the second die so that the second reflector faces the gap, and a second through opening passing through the second supporting portion laterally to the second cavity;

wherein the first supporting portion also has defined therein a first through opening arranged laterally to the first cavity;

wherein the second supporting portion also has defined therein a second through opening arranged laterally to the second cavity; and wherein at least one of the first and second openings has inner walls shaped so as to limit multiple reflections within it.

26. The electronic module according to claim 25, wherein said first reflector, said second reflector, said first opening, and said second opening are mutually arranged so that a beam enters the gap through one of the first and second openings, strikes the first reflector or the second reflector, is deflected towards the other one of the first reflector and the second reflector, and exits the gap through the other one of the first opening and the second opening.

27. The electronic module according to claim 25, wherein the first and second supporting portions each carry a first electrical-connection element and a second electrical-connection element, respectively, the first die being coupled to the first electrical-connection element and the second die being coupled to the second electrical-connection element.

28. The electronic module according to claim 25:
wherein the first and second reflectors are micromirror reflectors; and
wherein at least one of the first and second reflectors is configured to oscillate about a resting position.

29. The electronic module according to claim 25:
wherein the first and second supporting portions are hermetically coupled together so that said gap is fluidically isolated with respect to an environment external to the electronic module; and
wherein the gap is filled by a liquid or gaseous fluid.

30. An electronic module comprising:
a first die of semiconductor material including a first reflector;
a second die of semiconductor material including a second reflector; and
a frame including a first supporting portion and a second supporting portion, wherein the first and second supporting portions extend parallel to one another, wherein the frame is monolithic;

wherein the first and second dies are carried, respectively, by the first and second supporting portions and are respectively arranged so that the first reflector faces the second supporting portion and the second reflector faces the first supporting portion.

31. The electronic module according to claim 30, wherein the first and second reflectors are staggered with respect to one another.

32. The electronic module according to claim 30, wherein the first and second supporting portions are arranged at a mutual distance apart from one another so as to define a gap inside the frame.

33. The electronic module according to claim 32:
wherein the first supporting portion has a defined therein a first cavity that is configured to house at least in part the first die so that the first reflector faces the gap, and a first opening passing through the first supporting portion laterally to the first cavity; and
wherein the second supporting portion has defined therein a second cavity that is configured to house at least in part the second die so that the second reflector faces the gap, and a second opening passing through the second supporting portion laterally to the second cavity.

34. The electronic module according to claim 33:
wherein the first supporting portion also has defined therein a first opening arranged laterally to the first cavity; and
wherein the second supporting portion also has defined therein a second opening arranged laterally to the second cavity.

35. The electronic module according to claim 34, wherein said first reflector, said second reflector, said first opening, and said second opening are mutually arranged so that a beam enters the gap through one of the first and second openings, strikes the first reflector or the second reflector, is deflected towards the other one of the first reflector and the second reflector, and exits the gap through the other one of the first opening and the second opening.

36. A system, comprising:
an electronic module comprising;
a first die of semiconductor material including a first reflector;
a second die of semiconductor material including a second reflector;
a frame including a first supporting portion and a second supporting portion parallel to one another;
wherein the first and second supporting portions are joined together by a first connection portion having a bending area that joins the first and second supporting portions at a common connection portion;
wherein the first and second dies are carried, respectively, by the first and second supporting portions and are respectively arranged so that the first reflector faces the second supporting portion and the second reflector faces the first supporting portion;
a generator of a first light beam, arranged and configured to supply said first light beam towards the first reflector;
a detector configured to receive a second reflected beam from the second reflector and generate a transduced signal; and
a processing unit, operatively coupled to the detector, configured to carry out processing of the transduced signal.

37. The system according to claim 36, wherein said system is configured to define a picoprojector, a 3D-detection system, or a LIDAR system.

38. A system, wherein said system is configured to define a picoprojector, a 3D-detection system, or a LIDAR system and comprises:
- an electronic module comprising;
  - a first die of semiconductor material including a first reflector;
  - a second die of semiconductor material including a second reflector;
  - a frame including a first supporting portion and a second supporting portion parallel to one another;
  - wherein the first and second dies are carried, respectively, by the first and second supporting portions and are respectively arranged so that the first reflector faces the second supporting portion and the second reflector faces the first supporting portion;
  - wherein the first and second supporting portions are arranged at a mutual distance apart from one another so as to define a gap inside the frame;
  - wherein the first supporting portion has defined therein a first cavity that is configured to house at least in part the first die so that the first reflector faces the gap, and a first through opening passing through the first supporting portion laterally to the first cavity;
  - wherein the second supporting portion has defined therein a second cavity that is configured to house at least in part the second die so that the second reflector faces the gap, and a second through opening passing through the second supporting portion laterally to the second cavity;
  - wherein the first and second supporting portions are joined together by a first connection portion having a bending area that joins the first and second supporting portions at a common connection portion;
- a generator of a first light beam, arranged and configured to supply said first light beam towards the first reflector;
- a detector configured to receive a second reflected beam from the second reflector and generate a transduced signal; and
- a processing unit, operatively coupled to the detector, configured to carry out processing of the transduced signal;
- wherein when the system is configured to define a 3D-detection system, said processing comprises carrying out a 3D detection of an object or a subject through a structured-light approach and/or a time-of-flight approach.

39. The system according to claim 38, wherein said first reflector, said second reflector, said first through opening, and said second through opening are mutually arranged so that a beam enters the gap through one of the first and second through openings, strikes the first reflector or the second reflector, is deflected towards the other one of the first reflector and the second reflector, and exits the gap through the other one of the first through opening and the second through opening.

40. The system according to claim 38, wherein the first and second supporting portions are arranged at a mutual distance apart from one another so as to define a gap inside the frame.

41. The system according to claim 40:
- wherein the first supporting portion has a defined therein a first cavity that is configured to house at least in part the first die so that the first reflector faces the gap, and a first opening passing through the first supporting portion laterally to the first cavity; and
- wherein the second supporting portion has defined therein a second cavity that is configured to house at least in part the second die so that the second reflector faces the gap, and a second opening passing through the second supporting portion laterally to the second cavity.

42. The system according to claim 41:
- wherein the first supporting portion also has defined therein a first opening arranged laterally to the first cavity; and
- wherein the second supporting portion also has defined therein a second opening arranged laterally to the second cavity.

43. The system according to claim 42, wherein said first reflector, said second reflector, said first opening, and said second opening are mutually arranged so that a beam enters the gap through one of the first and second openings, strikes the first reflector or the second reflector, is deflected towards the other one of the first reflector and the second reflector, and exits the gap through the other one of the first opening and the second opening.

* * * * *